(12) United States Patent
Kim et al.

(10) Patent No.: US 9,268,206 B2
(45) Date of Patent: Feb. 23, 2016

(54) MULTI-PROJECTION SYSTEM USING INTERIOR SURFACE AS PROJECTION SURFACE

(71) Applicant: CJ CGV CO., LTD., Seoul (KR)

(72) Inventors: Hwan Chul Kim, Seoul (KR); Su Ryeon Kang, Goyang-si (KR)

(73) Assignee: CJ CGV CO., LTD., Seoul (KR)

( * ) Notice: Subject to any disclaimer, the term of this patent is extended or adjusted under 35 U.S.C. 154(b) by 108 days.

(21) Appl. No.: 14/219,683

(22) Filed: Mar. 19, 2014

(65) Prior Publication Data

US 2015/0062537 A1    Mar. 5, 2015

(30) Foreign Application Priority Data

Sep. 3, 2013   (KR) .................. 10-2013-0105278

(51) Int. Cl.
| | |
|---|---|
| H04N 9/31 | (2006.01) |
| A63J 25/00 | (2009.01) |
| G03B 21/60 | (2014.01) |
| G03B 35/20 | (2006.01) |
| G03B 37/04 | (2006.01) |

(52) U.S. Cl.
CPC ................ *G03B 21/60* (2013.01); *A63J 25/00* (2013.01); *G03B 35/20* (2013.01); *G03B 37/04* (2013.01); *H04N 9/3147* (2013.01); *H04N 9/3182* (2013.01); *H04N 9/31* (2013.01); *H04N 9/3185* (2013.01); *H04N 9/3188* (2013.01)

(58) Field of Classification Search
CPC ..... H04N 9/3147; H04N 9/31; H04N 9/3182; H04N 9/3185; H04N 9/3188; G03B 21/56–21/625; A63J 25/00
See application file for complete search history.

(56) References Cited

U.S. PATENT DOCUMENTS

| | | | |
|---|---|---|---|
| 6,554,433 B1 | 4/2003 | Holler | |
| 7,453,632 B2 * | 11/2008 | Beaty | G03B 21/56 359/443 |
| 7,667,892 B2 * | 2/2010 | Beaty | G03B 21/56 359/443 |
| 7,799,410 B2 * | 9/2010 | Tinianov | B32B 15/08 181/290 |
| 8,115,995 B2 * | 2/2012 | Beaty | G03B 21/56 359/443 |
| 8,269,902 B2 * | 9/2012 | Plut | H04N 9/3147 348/143 |
| 8,459,803 B2 * | 6/2013 | Plut | H04N 9/3117 353/30 |
| 8,646,920 B2 * | 2/2014 | Plut | H04N 9/3117 353/30 |
| 8,702,239 B2 * | 4/2014 | Olsen | G03B 21/208 353/30 |
| 8,944,612 B2 * | 2/2015 | Chang | G03B 21/13 349/5 |
| 2007/0115546 A1 * | 5/2007 | Beaty | G03B 21/56 359/443 |
| 2009/0004448 A1 * | 1/2009 | Tinianov | B32B 15/08 428/212 |

(Continued)

FOREIGN PATENT DOCUMENTS

| | | |
|---|---|---|
| JP | 2000122193 A | 4/2000 |
| JP | 2001033879 A | 2/2001 |
| KR | 2020090012444 | 12/2009 |

OTHER PUBLICATIONS

International Search Report for application No. PCT/KR2013/010889 dated Jun. 10, 2014.

(Continued)

*Primary Examiner* — Bao-Luan Le
(74) *Attorney, Agent, or Firm* — Hauptman Ham, LLP (57) ABSTRACT

The present invention provides a multi-projection system using an interior surface as a projection surface, the system including a screen installed in a single theater, a plurality of interior surfaces arranged around the screen, and two or more projection devices for projecting synchronized images on the screen and the interior surfaces.

10 Claims, 5 Drawing Sheets

(56) References Cited

U.S. PATENT DOCUMENTS

| | | | | |
|---|---|---|---|---|
| 2009/0067044 A1* | 3/2009 | Beaty | ............... | G03B 21/56 359/443 |
| 2010/0309390 A1* | 12/2010 | Plut | ............... | H04N 9/3147 348/744 |
| 2010/0309391 A1* | 12/2010 | Plut | ............... | H04N 9/3117 348/756 |
| 2011/0309999 A1* | 12/2011 | Chang | ............... | G03B 21/13 345/1.1 |
| 2012/0206343 A1* | 8/2012 | Plut | ............... | H04N 9/3117 345/156 |
| 2012/0206695 A1* | 8/2012 | Olsen | ............... | G03B 21/208 353/30 |
| 2013/0181901 A1 | 7/2013 | West | | |
| 2013/0258290 A1* | 10/2013 | Plut | ............... | H04N 9/3117 353/30 |

OTHER PUBLICATIONS

"Super size screen comes out by painting onto the wall", EtNEWS.com, Jan. 28, 2009, 1 page.

Korean Office Action for application No. 10-2013-0105278 dated Oct. 14, 2014.

* cited by examiner

MULTI-PROJECTION SYSTEM USING INTERIOR SURFACE AS PROJECTION SURFACE

CROSS REFERENCE TO RELATED APPLICATION

This application claims the priority of Korean Patent Application No. 10-2013-0105278, filed on Sep. 3, 2013 in the KIPO (Korean Intellectual Property Office), which is incorporated herein by reference in its entirety.

TECHNICAL FIELD

The present invention relates to a multi-projection system using an interior surface as a projection surface and, more particularly, to a multi-projection system in which a portion of a plurality of projection surfaces required for multi-projection is implemented with an interior surface (e.g., a wall surface, floor surface, ceiling surface, etc.).

BACKGROUND ART

Conventionally, in order to reproduce images such as movies, advertisements, etc., two-dimensional images are projected on a single screen arranged in front of a theater. However, audiences can only watch two-dimensional (2D) images under such a system.

Three-dimensional (3D) image technologies for providing audiences with 3D images have recently been developed. 3D image technologies use the principle of allowing an audience to feel the 3D effect even from a flat image when different images are presented to the left and right eyes of the audience and combined in the brain. In detail, two cameras equipped with different polarizing filters are used during filming, and the audience wears glasses with polarizing filters such that different images are presented to the left and right eyes during watching.

However, while these 3D technologies can provide audiences with 3D images, the audiences just watch the images reproduced on a single screen, which may reduce the degree of involvement in the images. Moreover, the direction of the 3D effect that the audiences feel is limited to the direction of the single screen.

Furthermore, according to the conventional 3D technologies, the audiences must wear the glasses equipped with polarizing filters during watching, which may make the audiences feel inconvenient, and different images are artificially presented to the left and right eyes, which may make some sensitive audiences feel dizzy or nausea.

Therefore, a so-called "multi-projection system" which can solve the problems of the conventional projection systems based on the single screen has been proposed. The "multi-projection system" refers to a technology in which a plurality of projection surfaces are arranged around audience seats such that synchronized images are reproduced on the plurality of projection surfaces, thus providing audiences with the three-dimensional effect and immersion.

Meanwhile, the plurality of projection surfaces are necessarily required to implement the "the multi-projection system". Therefore, it is necessary to install an additional screen so as to construct the "the multi-projection system" in a conventional theater having only the single screen.

However, it is not easy to install the additional screen in the theater that has already been completed, and small and large constructions are required. Moreover, it may be impossible to install the additional screen due to the nature of the internal structure of some specific theaters.

Therefore, there is a need to develop a technology that can construct the multi-projection system without changing the structure of the conventional theater having only the single screen (without installing any additional screen).

DISCLOSURE OF INVENTION

Technical Problem

An object of the present invention is to provide a multi-projection system which can be constructed using the structure of a conventional theater having only a single screen as it is.

That is, an object of the present invention is to provide a multi-projection system which can be constructed without remodeling a conventional theater.

Solution to Problem

To achieve the above object, a multi-projection system in accordance with an embodiment of the present invention may comprise: a screen installed in a single theater; a plurality of interior surfaces arranged around the screen; and two or more projection devices for projecting synchronized images on the screen and the interior surfaces.

Here, the interior surface may be a wall surface, a floor surface, or a ceiling surface.

The interior surface may comprise a coating layer for improving optical properties.

The coating layer may improve polarization properties, scattering properties, or reflectance properties of the interior surface.

The coating layer may be formed by applying a paint for improving optical properties on the interior surface.

The paint may comprise: optical particles for improving optical properties; and a fluid serving as a carrier for the optical particles.

The optical particles may be formed by cutting or pulverizing an optical substrate including a metal layer or a dielectric layer.

The interior surface may comprise a sound insulating member layer, and the coating layer is formed on the sound insulating member layer.

The sound insulating member layer may comprise: a base layer in which a sound absorbing material is filled; a plasterboard layer formed on the base layer; a sound absorbing fabric layer formed on the plasterboard layer; and a noncombustible material layer formed on the sound absorbing fabric layer, and the coating layer may be formed on the noncombustible material layer.

The coating layer may include a color area displayed in gradation around the boundary between the screen and the interior surface.

The multi-projection system may further comprise a management device for controlling the operation of the two or more projection devices.

The management device may correct the images projected by the two or more projection devices and then transmit the corrected images to the two or more projection devices.

The management device may correct the images projected by the two or more projection devices so as to offset relative differences in properties between the screen and the interior surfaces.

ADVANTAGEOUS EFFECTS OF INVENTION

The present invention can implement a multi-projection system without installing an additional screen in a conventional theater having only a single screen. Specifically, a portion of a plurality of projection surfaces required for the multi-projection system can be implemented with an interior surface (e.g., a wall surface, floor surface, ceiling surface, etc.), and thus there is no need to install the additional screen.

Moreover, the present invention can improve optical properties of the interior surface by providing a coating layer on each of the interior surfaces (e.g., the wall surface, floor surface, ceiling surface, etc.) arranged around the screen. Specifically, the present invention can improve the optical properties of the interior surface with the coating layer, thus reducing the heterogeneity between the image reproduced on the interior surface and the image reproduced on the screen.

Furthermore, according to the present invention, the coating layer includes a color area displayed in gradation around the boundary between the screen and the interior surface, thus preventing the heterogeneity of the images that may be caused around the boundary.

In addition, the present invention can correct the images projected by the respective projection devices based on the relative differences in properties between the screen and the interior surface (e.g., a wall surface, floor surface, ceiling surface, etc.). Specifically, the present invention can analyze the relative differences in properties (such as color, reflectance, brightness, etc.) between the screen and the interior surface and correct the images to offset the analyzed differences in properties, thus reducing the heterogeneity between the image reproduced on the interior surface and the image reproduced on the screen.

MODE FOR THE INVENTION

Hereinafter, a multi-projection system according to the present invention will be described in detail with reference to the accompanying drawings. The following embodiments are provided only for illustrative purposes so that those skilled in the art can fully understand the spirit of the present invention, but the present invention is not limited thereby. Moreover, it is to be understood that all matters herein set forth in the accompanying drawings are to be interpreted as illustrative and may be in different forms from those actually implemented.

Next, a multi-projection system according to the present invention will be described with reference to FIGS. 1 to 7.

Figure 1:
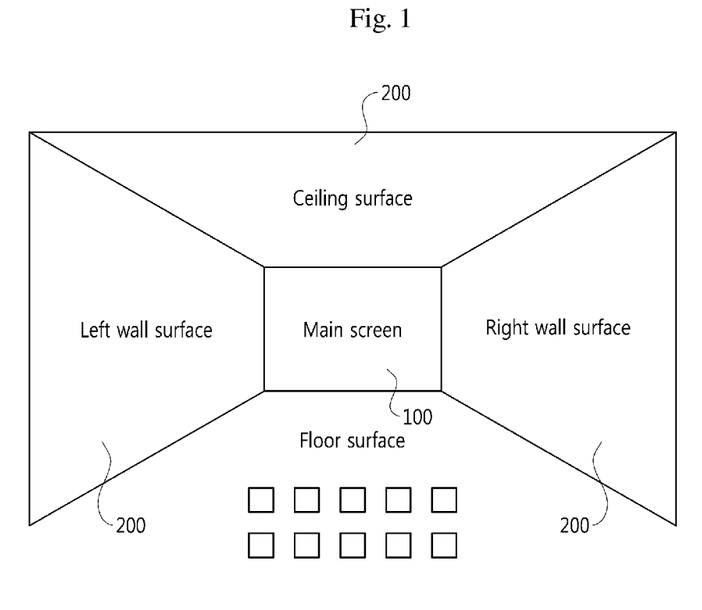
FIG. 1 is a conceptual diagram showing a theater according to the present invention.

Referring to FIG. 1, the multi-projection system according to the present invention may comprise a screen 100 installed in a single theater, a plurality of interior surfaces 200 arranged around the screen 100, and two or more projection devices 400 for projecting synchronized images on the screen 100 and the interior surfaces 200.

The multi-projection system is characterized by a multi-projection environment which is implemented using the single screen 100 and the plurality of interior surfaces 200.

The screen 100 corresponds to a single projection surface in a conventional projection system and serves as a main projection surface in the multi-projection system of the present invention.

The screen 100 may preferably be installed in front of audience seats, on which the image projected by the projection device 400 is displayed such that audiences can view the image.

Meanwhile, the screen 100 may be made of various materials such as paper, fiber, plastic, etc. in various sizes depending on the size of the theater. Moreover, the screen 100 may preferably be made in white color and may also be made in various colors.

The plurality of interior surfaces 200 refer to structural surfaces located around the screen 100 in the theater. For example, each of the plurality of interior surfaces 200 may be a wall surface, a floor surface, or a ceiling surface.

The plurality of interior surfaces 200 serve as projection surfaces. Specifically, the plurality of interior surfaces 200 serve as a plurality of projection surfaces for implementing the multi-projection system. Therefore, the two or more projection devices 400 may be installed to face the plurality of interior surfaces 200, and the images projected by the two or more projection devices 400 can be displayed on the interior surfaces 200 and provided to the audiences.

Meanwhile, the plurality of interior surfaces 200 are not configured to serve as the projection surface, and thus their optical properties are not good. Specifically, the plurality of interior surfaces 200 are generally uneven, dark in color, and composed of a sound insulating member or sound absorbing material, and thus their optical properties such as reflectance properties, polarization properties, scattering properties, etc. are not good. As a result, when the images are projected on the plurality of interior surfaces 200 as they are, unclear images may be reproduced, and in particular, images that cause significant heterogeneity, compared to the image reproduced on the screen 100, may be represented. Therefore, it is necessary to improve the optical properties of the plurality of interior surfaces 200.

Figure 2:
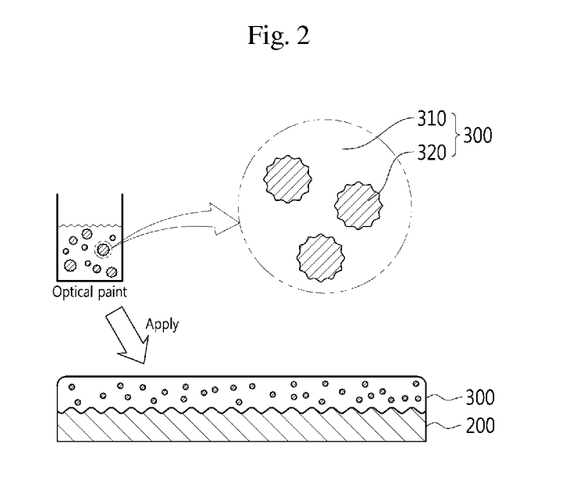
FIG. 2 is a cross-sectional view showing the structure of an interior surface according to the present invention.

Although there are various methods for improving the optical properties of the plurality of interior surfaces 200, a method of forming a coating layer 300 on the plurality of interior surfaces 200 may preferably be employed. Specifically, the coating layer 300 may be formed on the interior surfaces 200 to change their shapes to a flat shape and change their material to a material that has excellent optical properties (e.g., polarization properties, reflectance properties, scattering properties, etc.).

Moreover, although the coating layer 300 may be formed by various methods, it may preferably be formed by applying an optical paint on the interior surface 200. Specifically, as shown in FIG. 2, the coating layer 300 may be formed by applying an optical paint capable of improving the optical properties on the interior surface 200. Here, the optical paint may comprise various types or various states of materials and may preferably comprise optical particles 320 for improving the optical properties and a fluid 310 that serves as a carrier.

The optical particles 320 refer to particles contained in the coating layer 300 to improve the optical properties. The optical particles 320 may comprise various fine particles for improving the optical properties such as, for example, metal particles (e.g., aluminum) having excellent reflection properties, dielectric particles (e.g., silicon particles, magnesium fluoride particles, etc.) having excellent optical properties, etc. Meanwhile, the optical particles 320 may be formed by cutting or pulverizing an optical substrate including a metal layer (e.g., an aluminum layer, etc.) or a dielectric layer (e.g., a silicon oxide layer, etc.). That is, the optical particles 320 may be formed by deforming the optical substrate including the metal layer or dielectric layer by a physical method.

The fluid 310 serves as a carrier that allows the optical particles 320 to be coated. The fluid 310 may comprise various fluid materials and may preferably comprise PVC resin, enamel, polyurethane, acrylic resin, lacquer, etc.

Figure 3:
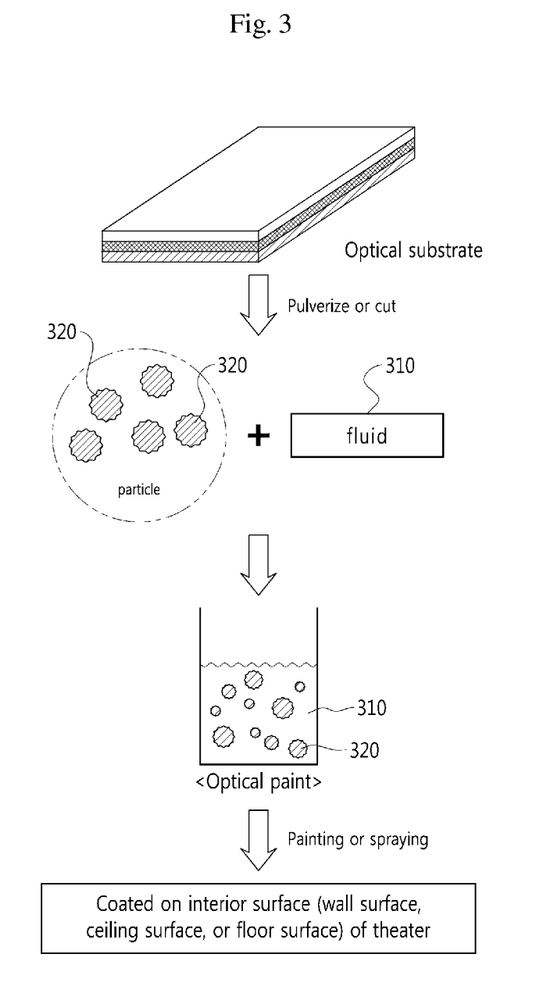
FIG. 3 is a conceptual diagram showing a process of forming a coating layer according to the present invention.

An example of forming the coating layer 300 on the interior surface 200 will now be described with reference to FIG. 3. (1) First, to form the optical particles 320 that will be contained in the paint, the optical substrate including the metal layer or dielectric layer is pulverized or cut by a physical method. Here, the physical method may include various methods such as pulverization or cutting using ultrasonic waves, grinding, pulverization by jet mill, etc. (2) Then, the thus formed optical particles 320 are mixed with the fluid 310 to prepare an optical paint. (3) Next, the thus prepared optical paint is applied to the interior surface 200 by painting or spraying, thus forming the coating layer 300 on the interior surface 200.

Figure 4:
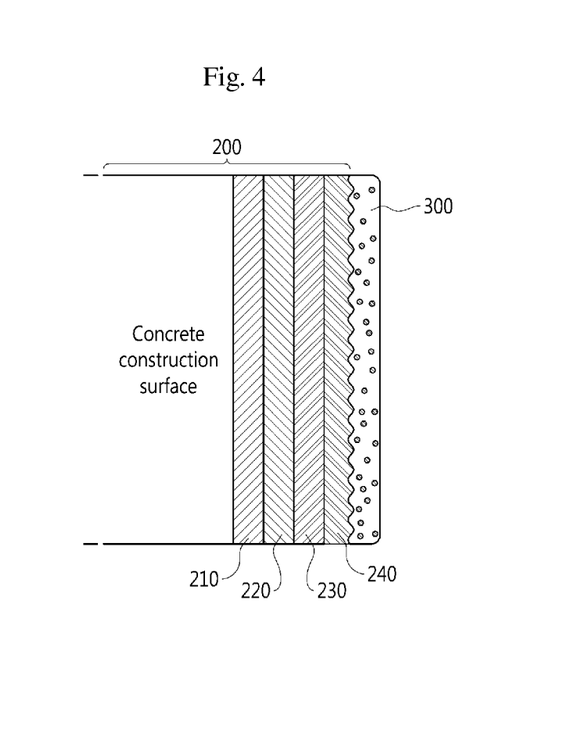
FIG. 4 is a cross-sectional view more specifically showing the structure of the interior surface according to the present invention.

Meanwhile, a specific example of the interior surface 200 will now be described with reference to FIG. 4. The interior surface 200 may be formed into a structure that includes a construction surface, a sound insulating member layer provided on the construction surface, and a coating layer 300 formed on the sound insulating member layer.

The construction surface is a structural surface that serves as the basic framework of a building and may preferably be formed of concrete.

The sound insulating member layer is a structural surface that is provided for sound insulation on the construction surface. Although the sound insulating member layer may be formed of a single material or formed into a single layer, it may preferably be formed into a multi-layered structure having various materials as shown in FIG. 4. Referring to FIG. 4, the sound insulating member layer may comprise a base layer 210, a plasterboard layer 220, a sound absorbing fabric layer 230, and a noncombustible material layer 240. (1) Here, the base layer 210 is a structure provided on the construction surface and may preferably be composed of a stud (framework) and a glass wool (sound absorbing material) filled in the stud. (2) The plasterboard layer 220 is a structure provided on the base layer 210 and is also used for the sound absorption. Meanwhile, the plasterboard layer 220 may be connected to the base layer 210 by various methods and may preferably be connected to the base layer 210 by screw connection. (3) The sound absorbing fabric layer 230 is a structure provided on the plasterboard layer 220 and is also used for the sound absorption. The sound absorbing fabric layer 230 may be composed of various sound absorbing fabrics such as fabric, tectum, etc. and may preferably be connected to the plasterboard layer 220 by molding. (4) The noncombustible material layer 240 is a structure provided on the sound absorbing fabric layer 230 and is used to protect the above-described layers and to serve as a noncombustible material.

The coating layer 300 is formed on the noncombustible material layer 240 and serves to improve the optical properties of the surface of the noncombustible material layer 240. Specifically, the coating layer 300 can change the surface structure of the noncombustible material layer 240 to a flat structure and improve the optical properties of the surface (e.g., reflectance properties, polarization properties, scattering properties, etc.). The specific features of the coating layer 300 have been described above, and thus detailed description thereof will be omitted.

The two or more projection devices 400 project images on the screen 100 and the plurality of interior surfaces 200. These projection devices 400 may have a heating unit such as an optical system, may project magnified images on the screen, and may be implemented in various manners. For example, the projection devices may be implemented in various ways, such as by using a cathode ray tube (CRT), using a liquid crystal display (LCD), by digital light processing (DLP) using a digital micromirror device (DMD) chip, by liquid crystal on silicon (LCoS), etc.

Moreover, the two or more projection devices 400 may project synchronized and unified images on the screen 100 and the plurality of interior surfaces 200. Therefore, the audiences can recognize synchronized images, projected by the two or more projection devices 400, in various directions of the screen 100 and the interior surfaces 200, thus improving the three-dimensional effect and immersion that the audiences feel from the images.

Meanwhile, the two or more projection devices 400 may be selectively operated. Through the selective operation, (1) the synchronized images may be projected on the screen 100 and the plurality of interior surfaces 200 together; (2) the synchronized images may be projected on the screen 100 and a portion of the plurality of interior surfaces 200; or (3) the synchronized images may be projected on the screen 100 only. Moreover, the projection operations may be performed alternately to provide a dynamic visual effect.

Figure 5:
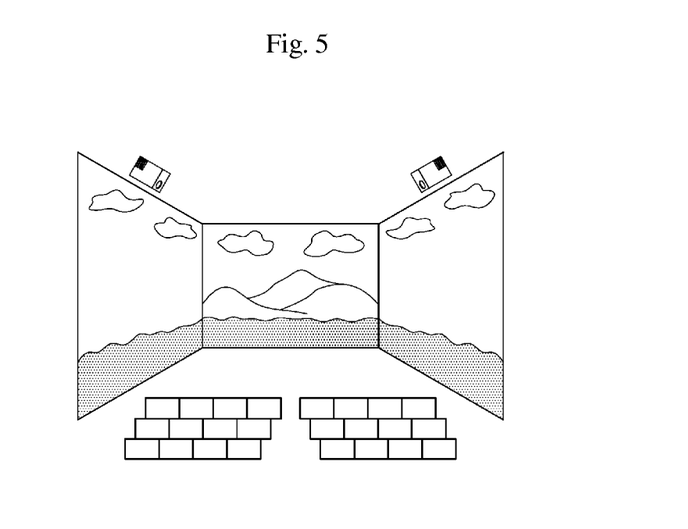
FIGS. 5 to 7 are diagrams showing examples of a multi-projection system implemented in a theater according to the present invention.
Figure 6:
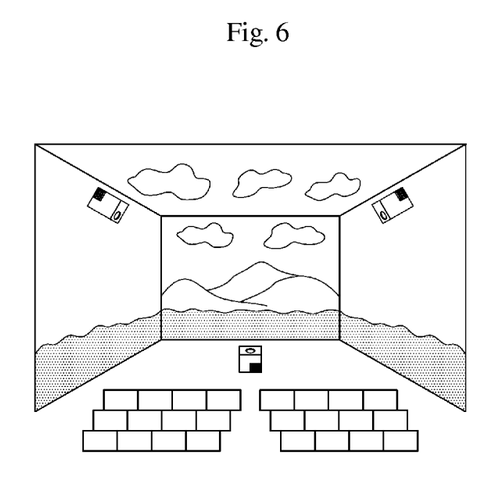
Figure 7:
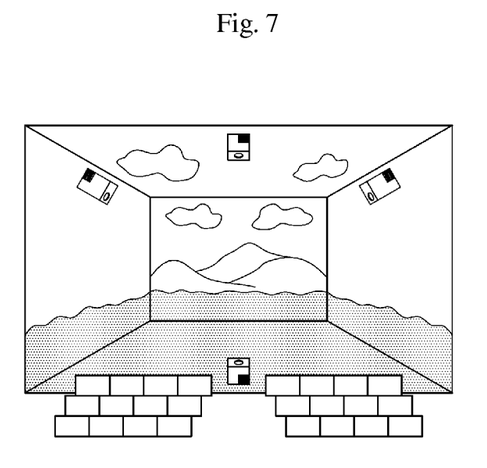

Referring to FIGS. 5 to 7, there are various examples of the multi-projection system.

First, FIG. 5 shows an example of the multi-projection system in which the screen 100, the left wall surface, and the right wall surface are used as the projection surfaces.

Moreover, FIG. 6 shows an example of the multi-projection system in which the screen 100, the left wall surface, the right wall surface, and the ceiling surface are used as the projection surfaces.

Furthermore, FIG. 7 shows an example of the multi-projection system in which the screen 100, the left wall surface, the right wall surface, the ceiling surface, and the floor surface are used as the projection surfaces.

Next, a multi-projection system in accordance with another embodiment of the present invention will be described with reference to FIG. 8.

Figure 8:
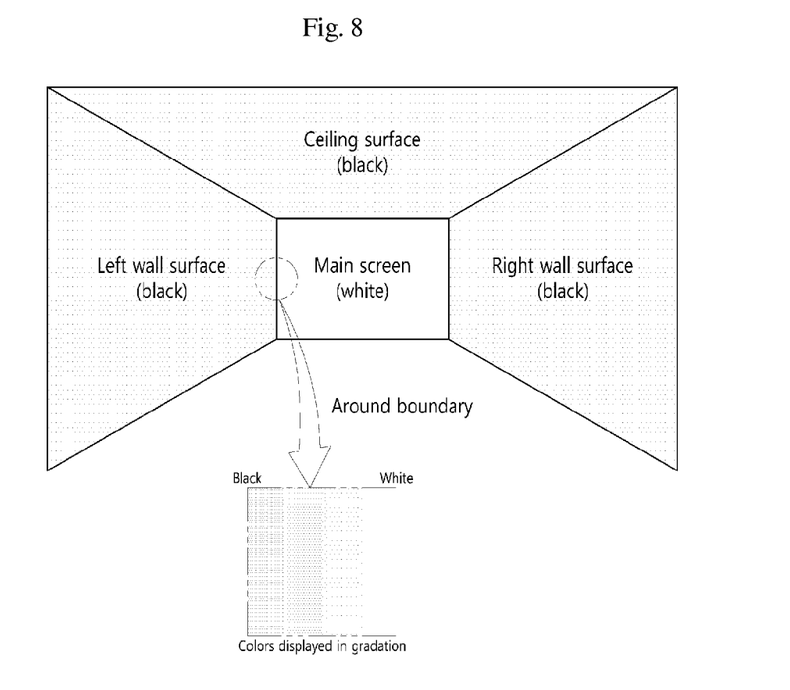
FIG. 8 is a conceptual diagram showing an example in which a coating layer according to the present invention includes a color area displayed in gradation.

Referring to FIG. 8, according to the multi-projection system in accordance with another embodiment of the present invention, the coating layer 300 may display colors in some areas of the interior surfaces 200. Specifically, the coating layer 300 may display colors including coloring pigments in some areas of the interior surfaces 200.

Here, it is preferable that the area in which the colors are displayed is around the boundary between the screen 100 and the interior surface 200.

Moreover, it is preferable that the coating layer 300 displays the colors in gradation around the boundary between the screen 100 and the interior surface 200 as shown in FIG. 8.

Furthermore, it is preferable that the coating layer 300 displays the colors between the screen 100 and the interior surface 200 in gradation. For example, when the color of the screen 100 is white and that of the interior surfaces 200 is black, it is preferable that the collating layer 300 displays the colors between white and black in gradation.

Therefore, the change in the colors around the boundary between the screen 100 and the interior surface 200 can be reduced by the display of the colors in gradation, thus preventing the heterogeneity of the images that may be caused by the rapid change in the colors.

Next, a multi-projection system in accordance with still another embodiment of the present invention will be described with reference to FIG. 9.

Figure 9:
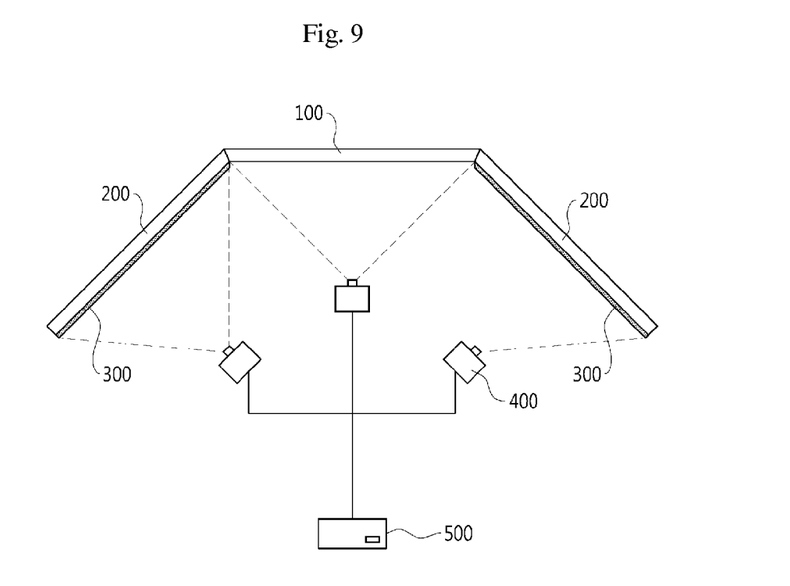
FIG. 9 is a diagram showing the configuration of a multi-projection system according to the present invention.

Referring to FIG. 9, the multi-projection system according to the present invention may further comprise a management device 500.

The management device 500 controls the two or more projection devices 400. The management device 500 may be connected in parallel to the two or more projection devices 400 to control the respective projection devices 400 either simultaneously or individually.

Moreover, the management device 500 may manage the images projected by the two or more projection devices 400. Specifically, the management device 500 may generally control the images projected by the two or more projection devices 400. The management device 500 may determine an image that will be projected by each projection device 400 and transmit the determined images to the respective projection devices 400. Here, the management device 500 may manage the images projected by the two or more projection devices 400 in various ways such as (1) storing the images to be projected by the respective projection devices 400 previously in a database and transmitting the stored images to the respective projection devices 400, (2) generating the images that will be projected by the respective projection devices 400 in real time and transmitting the generated images to the respective projection devices 400, (3) receiving the images that will be projected by the respective projection devices 400 from the outside (through a communication network) in real time and transmitting the received images to the respective projection devices 400, etc.

Furthermore, the management device 500 may correct the images projected by the respective projection devices 400 based on relative differences in properties between the screen 100 and the interior surfaces 200 (e.g., the wall surface, floor surface, ceiling surface, etc.). Specifically, the management device 500 may analyze a relative difference in reflectance, a relative difference in brightness, a relative difference in chromaticity, etc. between the screen 100 and the interior surface 200 and correct the images projected by the respective projection devices 400 to offset the differences in properties. For example, when the brightness of a specific interior surface 200 is higher than that of the screen 100, the management device 500 may reduce the brightness of the image projected on the specific interior surface 200, thus offsetting the relative difference in brightness. Moreover, when the chromaticity of a specific interior surface 200 is lower than that of the screen 100, the management device 500 may increase the chromaticity of the image projected on the specific interior surface 200, thus offsetting the relative difference in chromaticity. Furthermore, when the reflectance of a specific interior surface 200 is higher than that of the screen 100, the management device 500 may reduce the brightness of the image projected on the specific interior surface 200, thus offsetting the relative difference in reflectance. Therefore, the management device 500 can prevent the heterogeneity of the images that may be caused by the projection surfaces of different types by correcting the images based on the differences in properties between the screen 100 and the interior surfaces 200.

Moreover, the management device 500 may control the two or more projection devices 400 to project synchronized images. Specifically, the management device 500 may synchronize the projection operations of the two or more projection devices 400 by transmitting a synchronization signal including time information to each projection device 400.

Meanwhile, the management device 500 may perform the function of generally managing the multi-projection system. Specifically, the management device 500 may manage a variety of information for implementing the multi-projection system and control the operation of various devices that may be contained in the system. The management device 500 may be implemented with various electronic devices. The management device 500 may be implemented with a single electronic device or with several electronic devices interconnected to each other. For example, the management device 500 may be implemented in a single server or in such a manner that two or more servers are interconnected. Moreover, the management device 500 may be implemented in such a manner that a server and other electronic devices are interconnected or implemented in arithmetic units other than the server.

Moreover, the management device 500 may transmit and receive information to and from various devices through various communication networks (wired or wireless) and various protocols and manage the multi-projection system using the transmitted and received information.

The invention has been described in detail with reference to preferred embodiments thereof. However, it will be appreciated by those skilled in the art that changes may be made in these embodiments without departing from the principles and spirit of the invention, the scope of which is defined in the appended claims and their equivalents.

The invention claimed is:

1. A multi-projection system comprising:
a screen installed in a single theater;
a plurality of interior surfaces arranged around the screen; and
two or more projection devices for projecting synchronized images on the screen and the interior surfaces, wherein
the interior surface comprises a sound insulating member layer and a coating layer formed on the sound insulating member layer for improving optical properties, and the sound insulating member layer comprises:
a base layer in which a sound absorbing material is filled;
a plasterboard layer formed on the base layer;
a sound absorbing fabric layer formed on the plasterboard layer; and
a noncombustible material layer formed on the sound absorbing fabric layer, and wherein
the coating layer is formed on the noncombustible material layer.

2. The multi-projection system of claim 1, wherein the interior surface is a wall surface, a floor surface, or a ceiling surface.

3. The multi-projection system of claim 1, wherein the coating layer improves polarization properties, scattering properties, or reflectance properties of the interior surface.

4. The multi-projection system of claim 1, wherein the coating layer is formed by applying a paint for improving optical properties on the interior surface.

5. The multi-projection system of claim 4, wherein the paint comprises: optical particles for improving optical properties; and a fluid serving as a carrier for the optical particles.

6. The multi-projection system of claim 5, wherein the optical particles are formed by cutting or pulverizing an optical substrate including a metal layer or a dielectric layer.

7. The multi-projection system of claim 1, wherein the coating layer comprises a color area displayed in gradation around the boundary between the screen and the interior surface.

8. The multi-projection system of claim 1, further comprising a management device for controlling the operation of the two or more projection devices.

9. The multi-projection system of claim 8, wherein the management device corrects the images projected by the two or more projection devices and then transmits the corrected images to the two or more projection devices.

10. The multi-projection system of claim 9, wherein the management device corrects the images projected by the two or more projection devices so as to offset relative differences in properties between the screen and the interior surfaces.

\* \* \* \* \*